(12) United States Patent
Hansen et al.

(10) Patent No.: US 6,191,949 B1
(45) Date of Patent: *Feb. 20, 2001

(54) APPLICATION SPECIFIC INTEGRATED CIRCUIT PACKAGE AND INITIATOR EMPLOYING SAME

(75) Inventors: David D. Hansen, Layton; David B. Monk, Salt Lake; Mark B. Woodbury, Bountiful; Gerold W. Pratt, Kaysville, all of UT (US)

(73) Assignee: Autoliv ASP, Inc., Ogden, UT (US)

( * ) Notice: Under 35 U.S.C. 154(b), the term of this patent shall be extended for 0 days.

This patent is subject to a terminal disclaimer.

(21) Appl. No.: 09/464,339

(22) Filed: Dec. 15, 1999

Related U.S. Application Data

(62) Division of application No. 08/898,393, filed on Jul. 22, 1997.

(51) Int. Cl.[7] .................. H05K 7/10; F42B 3/10
(52) U.S. Cl. ............... 361/735; 361/790; 280/741; 280/735; 102/202.5; 102/202.7; 102/202.14
(58) Field of Search ................. 361/735, 790; 280/741, 735; 102/202.5, 202.7, 202, 14, 530

(56) References Cited

U.S. PATENT DOCUMENTS

| | | | |
|---|---|---|---|
| 5,053,588 | * 10/1991 | Bolender | 200/61.45 R |
| 5,149,925 | * 9/1992 | Behr et al. | 200/61.45 |
| 5,178,409 | 1/1993 | Hiramitsu . | |
| 5,320,382 | 6/1994 | Goldstein . | |
| 5,322,325 | 6/1994 | Breed . | |
| 5,335,941 | * 8/1994 | Fohl | 280/206 |
| 5,337,674 | 8/1994 | Harris . | |
| 5,346,254 | 9/1994 | Esterberg . | |
| 5,411,289 | * 5/1995 | Smith et al. | 280/735 |
| 5,460,405 | 10/1995 | Faigle . | |
| 5,473,109 | * 12/1995 | Plankl et al. | 174/35 C |
| 5,544,915 | * 8/1996 | Fendt et al. | 280/735 |
| 5,554,806 | * 9/1996 | Mizuno et al. | 248/27.1 |
| 5,602,734 | * 2/1997 | Kithil | 364/424.055 |
| 5,777,227 | * 6/2000 | Cho et al. | 73/514.38 |
| 5,899,949 | 5/1999 | Kincaid . | |
| 5,932,832 | * 8/1999 | Hansen et al. | 102/202.4 |
| 6,070,531 | * 6/2000 | Hansen et al. | 102/202.5 |

* cited by examiner

*Primary Examiner*—Jeffrey Gaffin
*Assistant Examiner*—David Foster
(74) *Attorney, Agent, or Firm*—Sally J. Brown

(57) ABSTRACT

An initiator for an inflator of an automotive airbag restraint system includes a housing and a wall dividing the housing into two parts, one for housing a firing element of the initiator, and one for receiving at least one application specific integrated circuit which performs functions of a portion of an electronic control unit. A mounting element is located in the second part of the housing, and at least one application specific integrated circuit is carried by the mounting element. The mounting element and two or more application specific integrated circuits may be provided as a package, in which at least two application specific integrated circuits are mounted in a stacked condition to form an application specific integrated circuit stack. The application specific integrated circuits are configured such that predetermined electrical circuit locations of adjacent ones of the application specific integrated circuits to be interconnected are aligned. The package includes connectors for electrically interconnecting these predetermined electrical circuit locations in adjacent ones of the application specific integrated circuits in the stack.

4 Claims, 3 Drawing Sheets

APPLICATION SPECIFIC INTEGRATED CIRCUIT PACKAGE AND INITIATOR EMPLOYING SAME

This action is a division of 08/898,393, filed on Jul. 22, 1997.

BACKGROUND OF THE INVENTION

This invention is directed generally to the area of passive inflatable restraints or airbags for automotive vehicle occupants, and more particularly to an improved packaging of application specific integrated circuits for controlling deployment of such airbags, as well as a novel initiator design which incorporates an application specific integrated circuit.

An airbag restraint system is often provided in the form of a module including a housing which encloses a gas generator or inflator and at least part of an airbag, and a cover which conceals the module from view. The cover may be incorporated into the interior design of the vehicle in which the airbag restraint system or module is to be employed. Previously, such modules were employed on the driver side and on the passenger side at the front of the vehicle for protecting driver and passenger from front end collisions. The driver side module is often incorporated in the steering wheel of the vehicle while the passenger side module is often incorporated in the dashboard, aligned with the front passenger seating area.

More recently, airbag modules have also been employed to protect against side impact. These side modules are often incorporated in the vehicle doors on both the driver and passenger sides of the vehicle. More recently yet, there has been discussion of employing airbag modules at yet other parts of the interior of the vehicle to protect against various other types of impact at different points of the vehicle.

Typically, the inflator produces an inert gas such as nitrogen, which is directed into the airbag to force the airbag into the passenger compartment of the vehicle. In a pyrotechnic type of inflator, this gas is produced by the burning of a gas generating material. In order to trigger or initiate the burning of the gas generating material in such a pyrotechnic inflator an initiator or so-called squib is generally utilized. A typical initiator has a bridge wire embedded in a pyrotechnic material that will ignite or fire rapidly when brought to sufficiently high temperature. Heating of the bridge to a required temperature is normally effected by passing a direct electrical current through the bridge. The amount of electrical current required to obtain the firing temperature is generally relatively small.

Other types of inflator modules are also utilized which produce inflating gas by the rapid release of a quantity of gas stored under pressure. Still other so-called "hybrid" inflators utilize both a quantity of gas stored under pressure as well as a quantity of gas produced by the burning of a pyrotechnic material. However, most designs for these two types of inflators also employ an initiator device of the general type described above for triggering the production and/or release of gas by the inflator.

In order to control the timing and circumstances under which the required direct current is provided to the bridge wire of the initiator, suitable electronic control circuitry is usually employed. This control circuitry incorporates diagnostics and deployment circuitry often referred to as a sensing and diagnostic module (SDM) and also known as an electronic control unit (ECU) This SDM or ECU provides a number of functions including testing and confirming the state of the initiator in both "ready" and "fired" modes, sensing the occurrence of an event requiring deployment of one or more airbags, arming the initiator and inhibiting or enabling the firing of the initiator, as well as applying energy required to fire the initiator. The ECU may also include a control and processing circuit which may interface with similar circuits associated with other inflator modules in the vehicle or with a host computer.

Often, the ECU (or SDM) has been mounted on one or more circuit boards located at various places in the vehicle. However, in the case of multiple inflator modules in various areas of the vehicle, some or all of the functions of the ECU may be centralized to avoid duplicative circuitry for functions common to all of the inflator modules. Moreover, with multiple modules, a central control unit may be used to make various decisions, for example whether to deploy only a single airbag or multiple airbags, depending on the nature of an airbag deployable event which is sensed. However, with the utilization of only a single central circuit for performing some or all of the functions of the ECU, there is the attendant problem of additional wiring and routing of signals to multiple inflator modules in the vehicle.

Thus, in designing a vehicle with multiple airbags, a number of choices must be made, e.g. whether to centralize all of the control circuit functions, to employ a distributed design wherein the several control functions to be performed are assigned to different locations in the vehicle, or to employ duplicate electronic control units individually in each inflator module to be utilized in the vehicle. However, the last approach still leaves the question of providing for coordination between the various modules in a deployment situation, which may require a communications bus to link the ICUs of several inflator modules.

The present invention proposes a novel design for an electronic control unit, employing application specific integrated circuits in a novel package or configuration. The present invention also proposes employing one or more application specific integrated circuits as a modular part of the initiator or squib element of an inflator for an airbag deployment system. By housing one or more application specific integrated circuits with the initiator, some or all of the functions of the ICU can be performed at the initiator This approach can facilitate a number of different design choices in the placement of other parts of the ECU circuitry at other locations in the vehicle. This could also simplify the wiring as compared to using a central ECU connected to multiple inflator modules. In the event all of the ECU functions were incorporated in application specific integrated circuits mounted in the initiator, theoretically only positive voltage and ground connections, and a communications bus for allowing communication between the ECUs at the different airbag locations would be required, greatly simplifying vehicle wiring with respect to the airbag deployment components.

In the past, the initiator has usually been constructed utilizing a glass and metal header which supports the bridge wire and a suitable electrical connector for joining the firing circuitry to the bridge wire. Typically, a plastic outer body of the initiator is injection molded around the glass and metal header. The heat and pressure involved in this injection molding process would probably destroy or seriously damage the electronic components of an application specific integrated circuit were the same to be employed as a part of the initiator.

OBJECTS AND SUMMARY OF THE INVENTION

Accordingly, it is a general object of the invention to provide a novel and improved initiator for an automotive airbag which incorporates one or more application specific integrated circuits.

A related object is to provide a novel and improved application specific integrated circuit package for use in an automotive airbag system.

Briefly, and in accordance with the foregoing objects, an application specific integrated circuit package for an electronic control unit of an automotive airbag restraint system comprises at least two application specific integrated circuits; rack means for mounting said at least two application specific integrated circuits in a stacked condition to form an application specific integrated circuit stack, said application specific integrated circuits being configured such that predetermined electrical circuit locations of adjacent ones of said application specific integrated circuits to be electrically interconnected are aligned, and connection means for electrically interconnecting said predetermined electrical circuit locations in adjacent ones of said application specific integrated circuits in said stack.

In accordance with another aspect of the invention, an initiator for an inflator of an automotive airbag restraint system comprises a housing; wall means dividing said housing into two parts, a first of said two parts being configured for housing a firing element of said initiator, and a second of said two parts being configured for receiving at least one application specific integrated circuit comprising a portion of an electronic control unit; application specific integrated circuit mounting means located in said second part of said housing, and at least one application specific integrated circuit mounted in said mounting means and comprising a portion of an electronic control unit for an automotive airbag restraint system.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description, taken in connection with the accompanying drawings in which like reference numerals identify like elements, and in which:

DETAILED DESCRIPTION OF THE ILLUSTRATED EMBODIMENT

Figure 1:
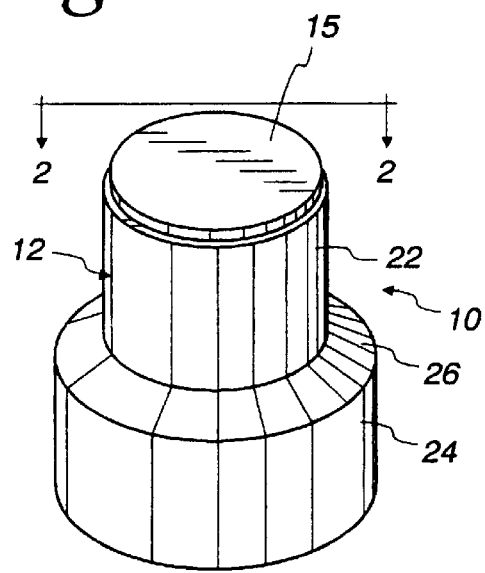
FIG. 1 is a perspective view of an initiator in accordance with one embodiment of the invention.
Figure 2:
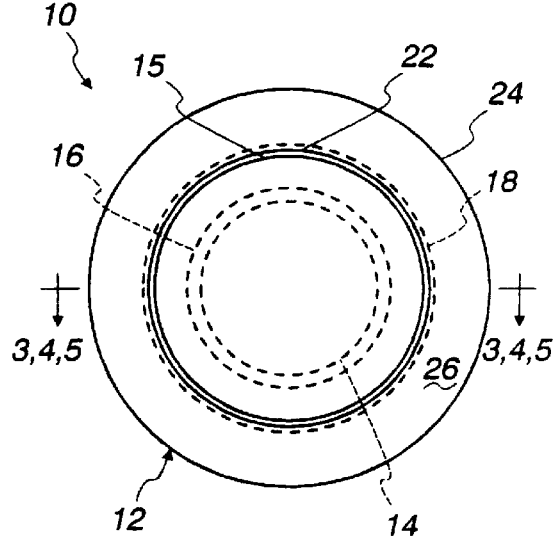
FIG. 2 is a top plan view taken generally in the plane of 1 the line 2—2 of FIG. 1.
Figure 3:
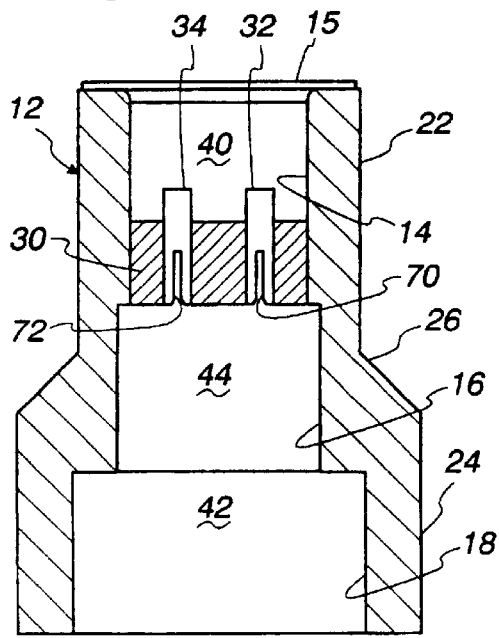
FIG. 3 shows a portion of the initiator of FIGS. 1 and 2, in a sectional view taken generally along the line 3—3 of FIG. 2.

Referring now to the drawings and initially to FIGS. 1–5, there is illustrated an initiator in accordance with one embodiment of the invention. As shown in FIGS. 1, 2, and 3, the initiator 10 includes a housing or shell 12 which comprises an elongate generally tubular member which is closed at one end by a closure disc 15. Preferably, the housing 12 and closure disc 15 are formed of a metal material, although other suitable materials may be utilized without departing from the invention.

Generally speaking, the hollow interior of the tubular housing 12 has a first or upper cylindrical inner wall portion 14 of a first diameter, a second or middle cylindrical inner wall portion 16 of a second, somewhat larger diameter, and a third or bottom cylindrical inner wall portion 18 of a third, yet larger diameter. As shown in FIG. 2, both the external and internal walls or surfaces of the housing 12 are generally circular in cross-section. Interior walls or surfaces 14, 16 and 18 are cylindrical surfaces, while the corresponding external surfaces 22 and 24 are also cylindrical and are joined by a sloped or frusto-conical surface 26.

The interior of the housing is further divided into two sections 40 and 42 by a wall or barrier 30 which preferably comprises a glass to metal seal (GTMS). Embedded within and extending through the GTMS are two pins 32, 34 which serve as electrical attachment points to a firing element 36, which preferably comprises a printed circuit bridge. However, other types of firing element or bridge wire may be utilized without departing from the invention. Thus, the first section 40 of the interior portion of the housing defined by the GTMS 30 consists of a portion of the interior volume located within the first diameter interior wall surface 14. The second portion 42 of the housing which is defined to the other side of GTMS 30 includes that portion of the interior volume located within the respective inner wall surfaces 16 and 18.

In accordance with one aspect of the invention, the portion 42, and in particular, a sub-portion 44 thereof defined within the inner wall surface 16 is configured for receiving at least one application specific integrated circuit (ASIC). In the embodiment illustrated in FIG. 5, a total of four such application specific integrated circuits (ASICs) are indicated by respective reference numerals 50, 52, 54 and 56. As will be more fully described hereinbelow, the ASICs 50, 52, 54 and 56 preferably perform various functions of an electronic control unit (ECU) or sending and diagnostic module (SDM) for an automotive airbag restraint system.

Figure 4:
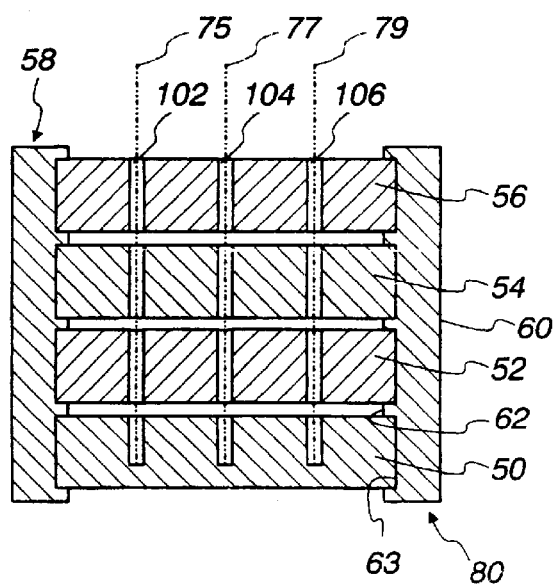
FIG. 4 is a sectional view of a portion of an application specific integrated circuit package in accordance with the invention, taken generally along the line 4—4 of FIG. 2.

Preferably, and referring also to FIG. 4, an application specific integrated circuit mounting means in the form of a rack or "chip rack" 58 is provided having an external surface 60 complementary with the internal wall surface 16 for interfitting therewith. The chip rack 58 presents interior wall surfaces 62 which are configured for receiving the respective ASICs 50, 52, 54, 56 and for holding the same in a spaced apart, aligned, stacked condition.

Figure 6:
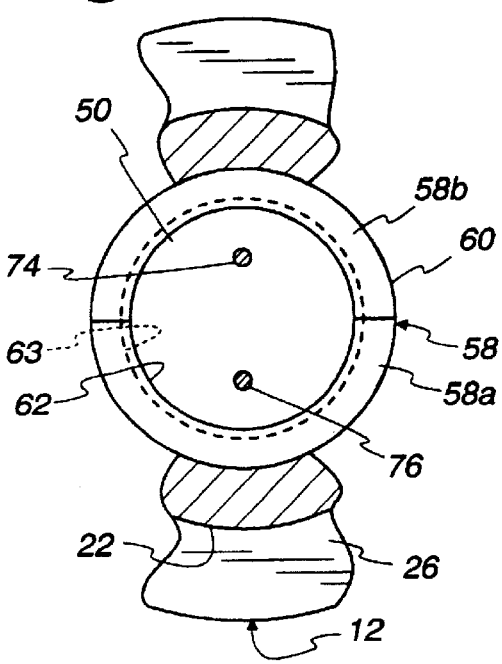
FIG. 6 is a partial sectional view taken generally in the plane of the lines 6—6 in FIGS. 5 and 8.

Preferably, the chip rack 58 is a generally cylindrical, tubular member, and is provided in a split configuration comprising two halves 8a and 8b as shown in FIG. 6. Thus, the halves 58a and 58b may be brought together about the ASICs 50, 52, 54 and 56 for assembly therewith, whereupon the two halves 8a and 8b may be joined by sonic welding or other adhesive means.

The internal surface 62 of the chip rack 58 preferably comprises a series of annular recesses 63 of complementary dimensions for grippingly engaging edge parts of the ASICs 50, 52, 54 and 56. In this regard, these ASICS are preferably generally disc-shaped elements. Each of the recesses 63 is flanked by radially inward projections which engage opposite surfaces of the respective ASICs, holding the same in place within the chip rack in a parallel, spaced apart or "stacked" condition.

The connectors or pins 32, 34 embedded in the GTMS 30 preferably include open-ended socket portions 70, 72 which face the ASICs 50, 52, 54, 56, and are preferably configured for receiving complementary mating pin connectors 74, 76 for delivering an energizing current to the firing element or printed circuit bridge element 36. Preferably, these latter pins 74 and 76 project from suitable portions of the ASIC 50, which preferably comprises circuitry for responding to a suitable triggering signal to apply sufficient energy to fire the bridge element 36. The circuit on the ASIC 50 may include what is generally referred to as an airbag deployment circuit which, in addition to applying sufficient energy to fire the bridge element 36, also contains circuitry to safe/arm the initiator and perform "smart" functions which inhibit or enable the firing of the initiator in response to suitable signals from other portions of the ECU.

Each of the remaining ASICs 52, 54 and 56 may comprise one of the following ECU/SDM components:

1) A crash detection circuit contains circuitry to sense the occurrence of an airbag deployable event, including an onboard accelerometer and support functions to discern the occurrence and severity of an event which necessitates the deployment of the airbag.

2) A diagnostics/logic circuit performs routine tests to confirm the state of the initiator at start-up and during operation of the vehicle and stores the condition status in a logic register. The logic registers present in this circuit will store information pertinent to the state of the initiator during both "ready" and "fixed" modes which may be downloaded to a host computer (either onboard or peripheral) for confirmation of the performance of the initiator.

3) A central processing unit (CPU) and communications circuit may control the functions of and run diagnostics routines on the individual ASICs and may also interface with other onboard intelligent initiators or a host computer (e.g., a central control ECU/SDM).

Figure 5:
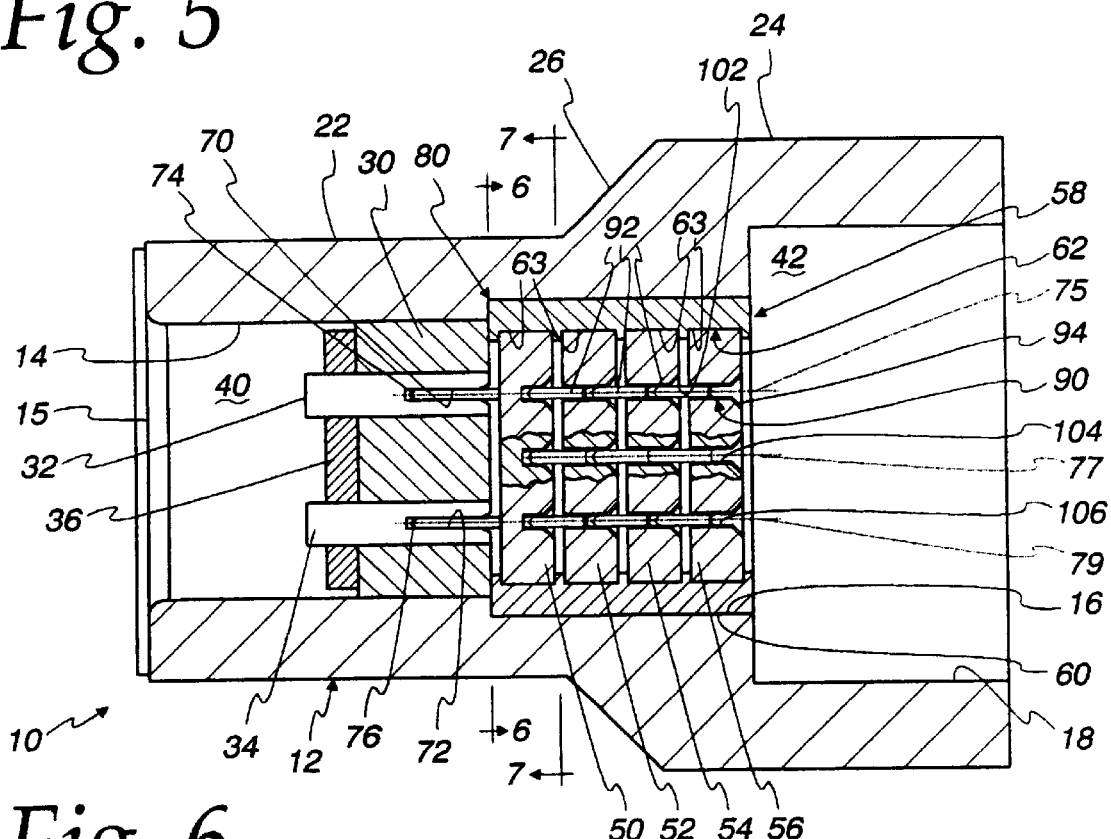
FIG. 5 is a sectional view taken generally along the line 5—5 of FIG. 2.
Figure 8:
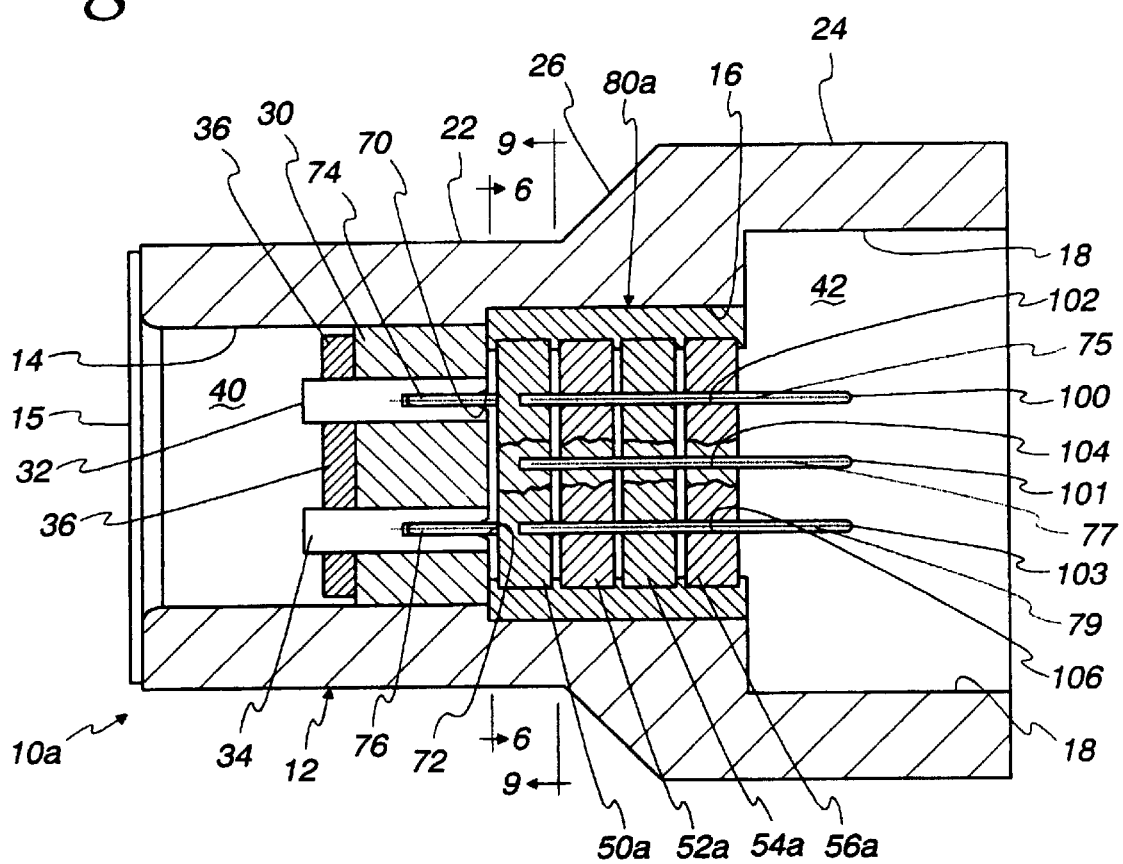
FIG. 8 is a sectional view similar to FIG. 5 of an alternate embodiment.

While a total of four such ASICs have been illustrated in the embodiments of FIGS. 5 and 8, it will be understood that the invention extends to the deployment of any one or more of these circuits mounted within the initiator housing 12. While the above description assumes that at least one circuit mounted within the initiator housing is an airbag deployment circuit which is responsible for energizing a bridge element 36 via the pins 74 and 76, it is not necessary to the invention that this circuit be deployed within the initiator. Rather, some other ASIC might be deployed, with the pins 74 and 76 running through such other ASIC to energize the bridge element 36. That is, the airbag deployment functions could be performed by a circuit in another location and coupled with pins 74 and 76 by suitable additional wiring and/or connectors.

In accordance with another aspect of the invention, two or more of the ASICs 50, 52, 54 and 56 and the mounting means or chip rack 58 together comprise an application specific integrated circuit package for an ECU or SDM of an automotive airbag restraint system. Thus, the mounting means or rack 58 is configured as noted above for holding two or more of the ASICs 50, 52, 54 and 56 together in a generally parallel, spaced apart, stacked condition to form an application specific integrated circuit stack designated generally by the reference numeral 80. As shown in FIG. 4, and with further reference to FIGS. 5–9, the ASICs 50, 52, 54 and 56 are configured such that predetermined electrical circuit locations of adjacent ones of the ASICs in the stack 80, which electrical circuit locations are to be electrically interconnected, are aligned. Moreover, suitable connectors or connection means for electrically interconnecting these predetermined electrical circuit locations in adjacent ones of the ASICs in the stack are provided.

Figure 7:
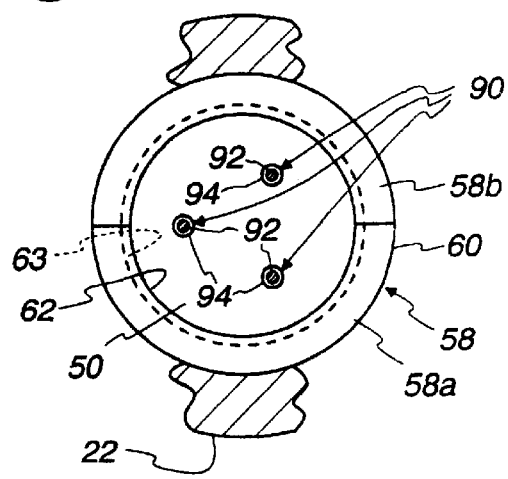
FIG. 7 is a partial sectional view taken generally along the line 7—7 of FIG. 5.
Figure 9:
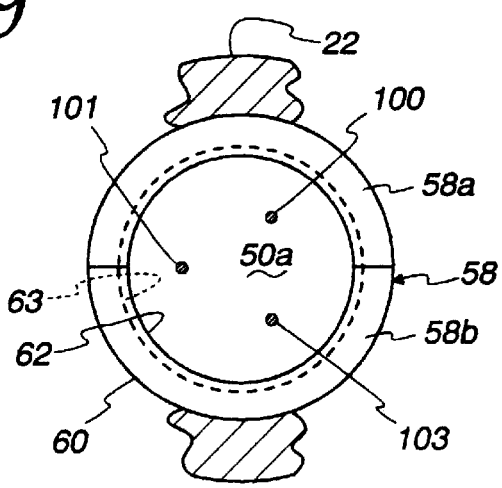
FIG. 9 is a partial sectional view taken generally in the plane of the line 9—9 of FIG. 8.

FIGS. 5–7 illustrate one embodiment of a configuration of such electrical connectors and interconnections between ASICs. FIGS. 8 and 9 illustrate a second embodiment thereof. Like reference numerals are utilized to designate like parts and components in FIGS. 8 and 9.

Referring first to FIGS. 5–7, connection means for interconnecting the predetermined electrical circuit locations on the respective ASICs 50, 52, 54 and 56 comprise a number of substantially similar electrically conductive socket/pin connector members or assemblies 90. In the embodiment illustrated, a total of three sets of these aligned locations and a corresponding three groups of aligned connection means or connector member 90 are utilized, as indicated by imaginary lines 75, 77 and 79. The aligned circuit portions and corresponding connectors which are aligned along respective lines 75, 77 and 79 may respectively comprise a positive voltage input, a ground connection and a communication bus. It is contemplated that with the stacked configuration of ASICs in accordance with the invention these three connections will be sufficient to carry all necessary electrical signals and power supplies to and from the respective ASICs. The actual locations of the lines 75, 77 and 79 and of the connectors 90 and the respective circuit points to be connected which are aligned therealong may of course vary from that illustrated without departing from the invention.

Only one of the socket/pin connectors 90 will be described, it being understood that the others are of similar configuration. Each of the connectors 90 is electrically connected with the electrical circuit location on its respective ASIC which is to be coupled with like electrical circuit locations on the other ASICs. Referring also to FIG. 4, the connectors 90 are mounted in respective through openings 102, 104, 106 in the respective ASICs 50, 52, 54, 56, which through openings are respectively aligned along the lines 75, 77 and 79. Preferably, as noted above, the electrical connections to the three connectors 90 of each ASIC respectively comprise a positive voltage supply, ground and a communication bus. Each of these connectors 90 includes a pin portion 92 which projects outwardly of one side of the associated ASIC and a socket portion 94 from which the pin portion projects and which opens at an opposite surface of the ASIC, that is, opposite the face thereof from which the pin 92 projects. Each pin portion 92 is of complementary configuration for electrically coupling with. a socket portion 94 of an aligned connector 90 of the next adjacent ASIC in the stack.

Conversely, each socket portion 94 is of complementary configuration for electrically coupling with a pin portion 92 of an aligned connector 90 of the next adjacent ASIC in the stack. The socket portion 94 of the ASIC 56 at one end of the stack or package 80 may receive a complementary mating pin (not shown) of a connector element (not shown) which preferably is of complementary form to interfit within the volume defined by the inner wall surface 18 of the housing 12. Preferably, this mating connector would be a three pin connector for connecting with the three socket portions 94 presented by the ASIC 56 along the three lines 75, 77 and 79. As mentioned above, these three connections may comprise a positive supply voltage, ground, and a communication bus. It will be noted that the connectors 90 of the ASIC 50 at the other end of the stack or package 80 have only socket portions 94 and do not have projecting pin portions. Also, the openings 102, 104, 106 do not project fully through this ASIC 50. Rather, the pins 74 and 76 which project from the ASIC 50 are not aligned with any of the connectors 90, as shown in FIGS. 6 and 7. These pins 74 and 76 energize the bridge element 36 and are coupled with suitable portions of an airbag deployment circuit which is preferably deployed on the ASIC 50.

Referring now to FIGS. 8 and 9, alternate forms of the initiator 10 and of the ASIC package 80 in accordance with the invention are illustrated and designated 10a and 80a. Like reference numerals are utilized to designate those elements and components of FIGS. 8 and 9 that are the same as components previously described with reference to the preceding description It will be noted that the ASICs 50a, 52a, 54a and 56a are substantially similar to those illustrated and described above with reference to FIG. 5, having respective aligned through openings 102, 104 and 106 therein in which suitable connecting means or elements may be deployed.

However, departing from the pin and socket configuration of the connectors 90 utilized in FIG. 5, a single elongate pin 100, 101, and 103 extends through each of the respective groups of aligned openings 102, 104 and 106 in the ASICs 50a, 52a, 54a, and 56a. Thus, the appropriate circuit portions of each of the ASICs are aligned so as to make electrical contact with the respective through connecting pins 100, 101 and 103. As in the embodiment of FIG. 5, the ASIC 50a has openings 102, 104, 106 which do not extend fully therethrough but rather receive end portions of the respective connecting pins 100, 101 and 103 extending only partially therethrough.

The respective pin connectors 74, 76 for energizing the bridge element 36 project from an opposite side of the ASIC 50a (which preferably includes the airbag deployment circuit as described above). These pins 74 and 76 make appropriate circuit connections with the airbag deployment circuit carried on the ASIC 50a. The pins 74 and 76 are not aligned with any of the through pins 100, 101, or 103, as shown in FIGS. 6 and 9. As in the embodiment of FIG. 5, in FIG. 8 a suitable mating connector (not shown) may be configured to interfit within the volume defined within the inner wall surface 18 of the housing or initiator body 12 for mating engagement with the projecting ends of the respective elongate through pins 100, 101 and 103.

In the foregoing descriptions and in the drawings, the electrical connections to the respective ASICs in the embodiments of FIG. 5 and FIG. 8 may be made at either surface thereof. Other configurations of connections, such as other locations and structures for respective connector elements such as the pin/socket connectors 90 of FIG. 3 or the through pins 100, 101, 103 of FIG. 6, may be utilized without departing from the invention. While these two examples of means for interconnecting the appropriate circuit locations on respective ASICs in the stack 80 have been illustrated and described herein, it will be understood that the invention is not limited thereto, but rather other equivalent schemes may be utilized without departing from the invention.

What have been illustrated and described herein is an application specific integrated circuit package for an electronic control unit of an automotive airbag restraint system, and a novel initiator for an automotive airbag restraint system which incorporates at least one application specific integrated circuit as an integral part thereof.

While particular embodiments of the invention have been shown and described in detail, it will be obvious to those skilled in the art that changes and modifications of the present invention, in its various aspects, may be made without departing from the invention in its broader aspect, some of which changes and modifications being matters of routine engineering or design, and others being apparent only after study. As such, the scope of the invention should not be limited by the particular embodiments and specific constructions described herein but should be defined by the appended claims and equivalents thereof. Accordingly, the aim in the appended claims is to cover all such changes and modifications as fall within the true spirit and scope of the invention.

The invention is claimed as follows:

1. An application specific integrated circuit package for an electronic control unit of an automotive airbag restraint system, comprising: at least two application specific integrated circuits; rack means for mounting said at least two application specific integrated circuits in a stacked condition to form an application specific integrated circuit stack, said application specific integrated circuits being configured such that predetermined electrical circuit locations of adjacent ones of said application specific integrated circuits to be electrically interconnected are aligned, and connection means for electrically interconnecting said predetermined electrical circuit locations in adjacent ones of said application specific integrated circuits in said stack.

2. An application specific integrated circuit package according to claim 1 wherein said connection means comprises an aligned through opening in each of said application specific integrated circuits adjacent each of said electrical circuit locations to be interconnected, and an elongate electrically conductive pin extendable through said aligned through openings.

3. An application specific integrated circuit package according to claim 2 wherein said connection means comprises a plurality of sets of said aligned through openings and a corresponding plurality of said elongate electrically conductive pins.

4. An application specific integrated circuit package according to claim 1 wherein said connection means comprises an electrically conductive socket/pin connector electrically coupled with each of predetermined ones of said electrical circuit locations to be electrically interconnected, each of said socket/pin connectors comprising a socket portion having an opening facing one surface of said application specific integrated circuit and a pin portion projecting from said socket outwardly of an opposite surface of said application specific integrated circuit, said pin portion being of complementary configuration for engaging an aligned socket portion of an adjacent application specific integrated circuit in said stack.

* * * * *